March 12, 1935.                H. FORD                 1,993,993
                            VEHICLE BRAKE
                        Filed Jan. 5, 1933            3 Sheets-Sheet 1
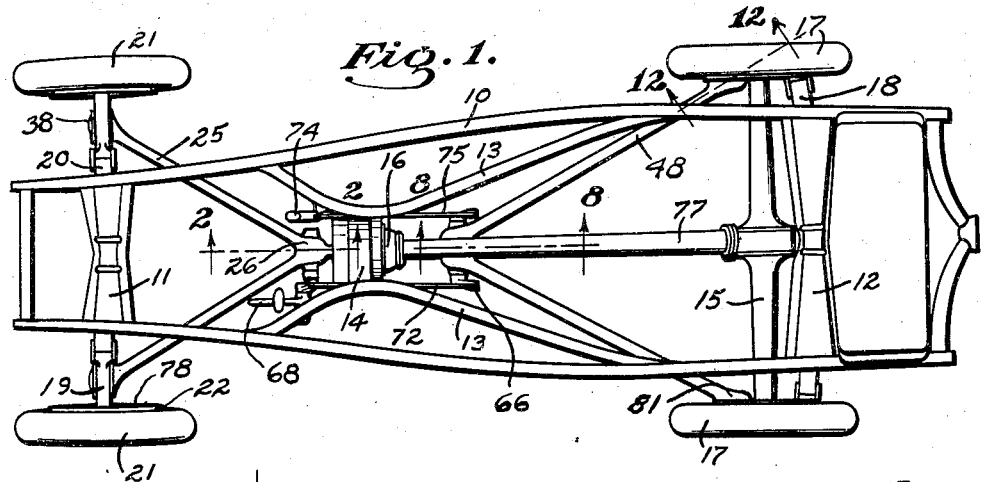
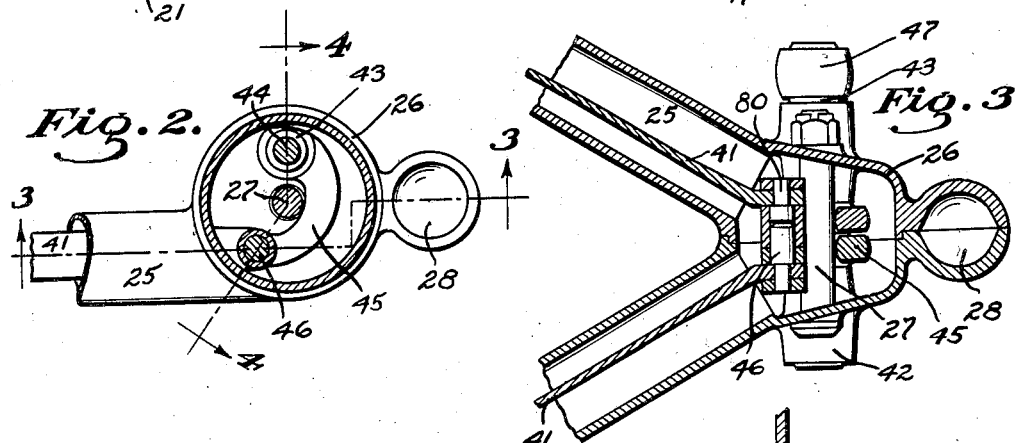
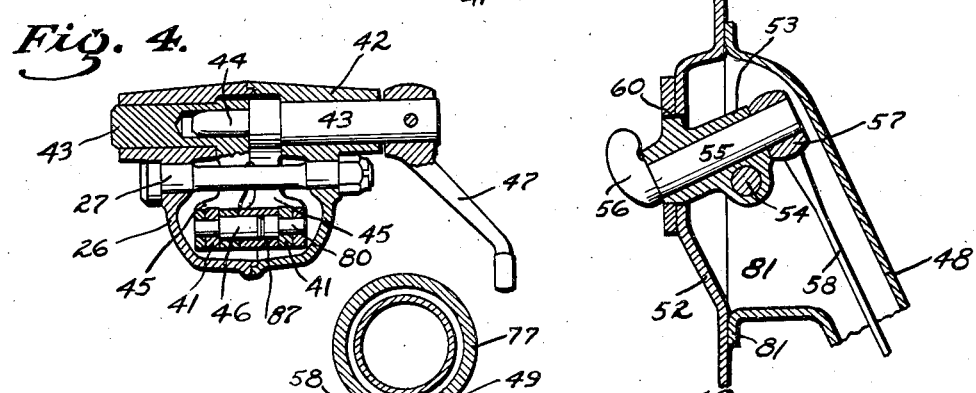
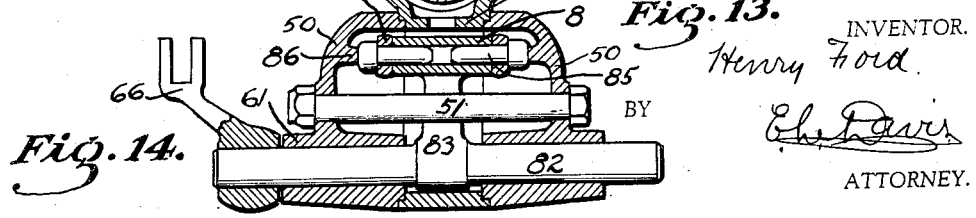
INVENTOR.
Henry Ford
BY
ATTORNEY.

March 12, 1935. H. FORD 1,993,993
VEHICLE BRAKE
Filed Jan. 5, 1933 3 Sheets-Sheet 2

INVENTOR.
Henry Ford
BY
ATTORNEY.

March 12, 1935.  H. FORD  1,993,993
VEHICLE BRAKE
Filed Jan. 5, 1933  3 Sheets-Sheet 3
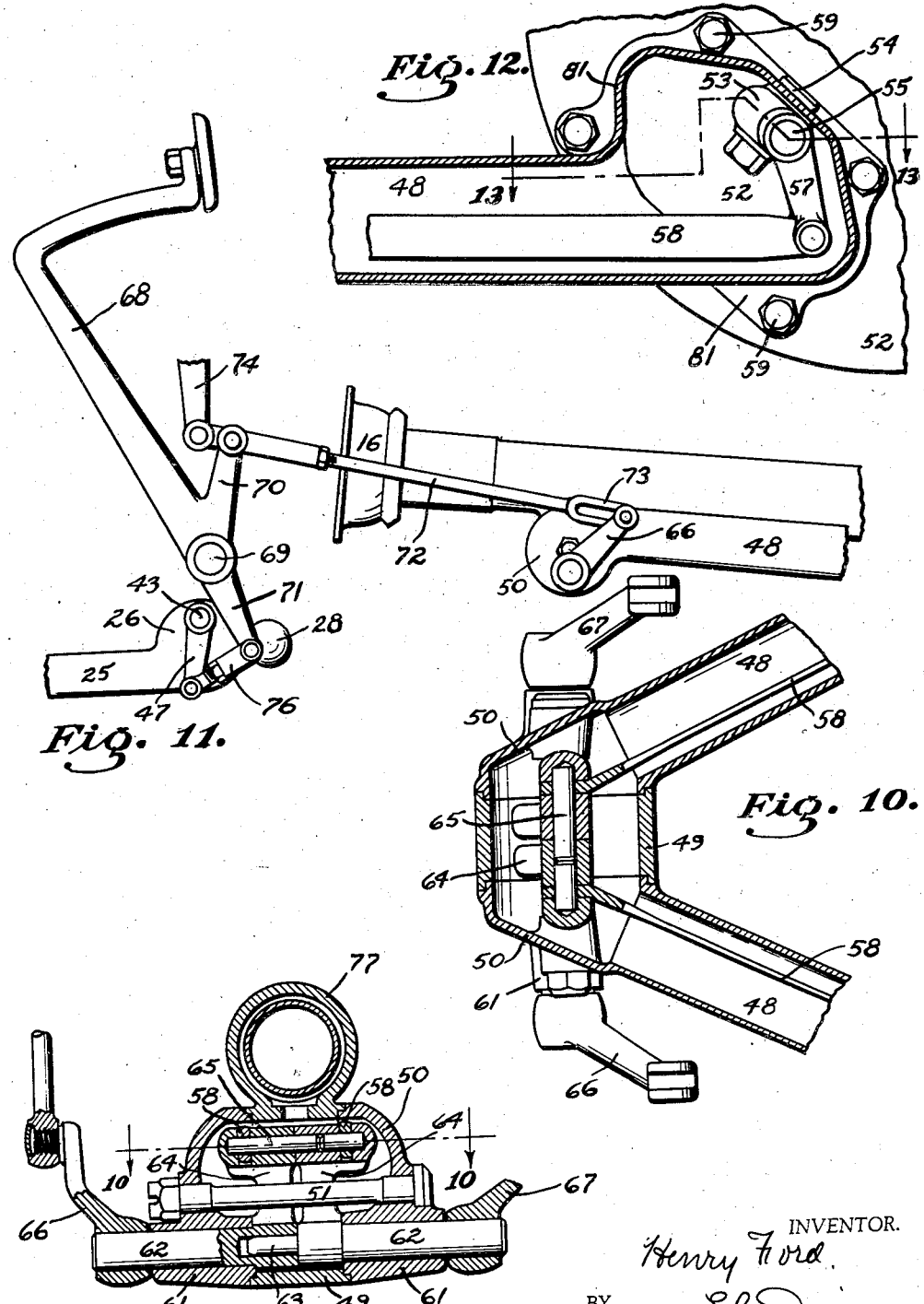
INVENTOR.
Henry Ford
BY
ATTORNEY.

Patented Mar. 12, 1935

1,993,993

UNITED STATES PATENT OFFICE 1,993,993

VEHICLE BRAKE

Henry Ford, Dearborn, Mich., assignor to Ford Motor Company, Dearborn, Mich., a corporation of Delaware Application January 5, 1933, Serial No. 650,296

11 Claims. (Cl. 188—10)

The object of my invention is to provide a vehicle brake especially adapted for use on automobiles, which brake will be exceptionally reliable to provide unfailing operation at all times. More particularly, my invention relates to a brake operating mechanism of novel construction whereby all four wheels of the car may be simultaneously stopped with a conventional service brake pedal, and whereby the rear wheel brakes of the car may be actuated by a hand lever to provide what is known as a parking brake. In this arrangement each of the four wheels of the car is provided with only a single brake drum and associated brake shoes. The application of the service brake pedal simultaneously applies all of the brake shoes to thereby stop the vehicle in the minimum length of time. It will further be noted that the parking brakes are applied by the movement of the hand lever which actuates only the two rear wheel brakes of the car. Special provision has been made herein whereby upon the failure through breakage or for any other reason of any single part in the entire braking system, the operator will be assured of being able to apply the brakes on at least two of the wheels by actuating either the brake pedal or the hand lever. For example, if the brake pedal itself fails then the application of the hand lever would apply the two rear wheel brakes. In like manner, should the cross shaft associated with the rear brakes fail then the application of the service pedal would at least apply the two front wheel brakes. As will be brought out further in the specification, the failure of any one part cannot put more than two brakes out of commission. This feature is of especial importance inasmuch as all of the braking wheels are normally retarded upon the actuation of the service brake pedal.

A feature of primary importance in connection with this invention is that the brake operating rods which ordinarily extend from the chassis frame to the vehicle wheels are housed inside of the chassis radius rods so as to be protected thereby. In this respect, the hook-up employed herein is one adaptation of the invention described and claimed in my United States Letters Patent No. 1,800,615 of April 14th, 1931. However, this latter construction is believed to be an improvement over the former design, due to the ease with which the hook-up may be assembled in the car.

As will be noted in the aforementioned patent, the brake operating rods, while extending through the radius rods, were still connected to levers mounted upon the chassis thereby requiring the insertion of a clevis pin to connect up the brake rods after the radius rods were secured in position. This operation, while possible, was difficult for the ordinary mechanic, so that a device easier to assemble was desirable. In the present brake the brake rods are connected to suitable levers which are mounted wholly within the radius rods so that the unit may be assembled on a bench and then this assembled unit is simply bolted in place on the chassis, the hook-up being thus accomplished.

Still a further novel feature of this invention is that the linkage which operates the brake rods of the car pivot around the same points as the chassis ends of the radius rods so that a variation in the braking loads on the respective wheels will not result, due to the oscillation of the axles relative to the chassis. This is a very important feature in all vehicle brakes and it is especially important in brakes wherein the wear of the individual brake shoes is depended upon to equalize the braking action. While this type of brake equalizer, or lack of the conventional equalizing beam, is believed to be the most reliable, still it requires that the linkage between the operating pedal or lever and each of the wheel brakes of the car be maintained at an exactly constant length to equally apply all of the brakes. This constant length cannot be maintained if any appreciable variation in effective length of the linkage arises due to the normal movement of the chassis frame relative to the axles.

With these and other objects in view my invention consists in the arrangement, construction and combination of the various parts of my improved device, as described in the specification, claimed in my claims and illustrated in the accompanying drawings in which:

Figure 1 shows a plan view of a vehicle chassis having my improved brake hook-up installed therein.

Figure 2 shows a sectional view, taken on the line 2—2 of Figure 1.

Figure 3 shows a sectional view, taken on the line 3—3 of Figure 2.

Figure 4 shows a sectional view, taken on the line 4—4 of Figure 2.

Figure 9 shows a sectional view, taken on the line 9—9 of Figure 8.

Figure 10 shows a sectional view, taken on the line 10—10 of Figure 8.

Figure 11 shows a side elevation of the brake linkage which connects the front and rear radius rods.

Figure 12 shows a sectional view, taken on the line 12—12 of Figure 1.

Figure 13 shows a sectional view, taken on the line 13—13 of Figure 12, and

Figure 14 is a view similar to Figure 9, showing an alternate construction which may be desirable to use.

Figure 5:
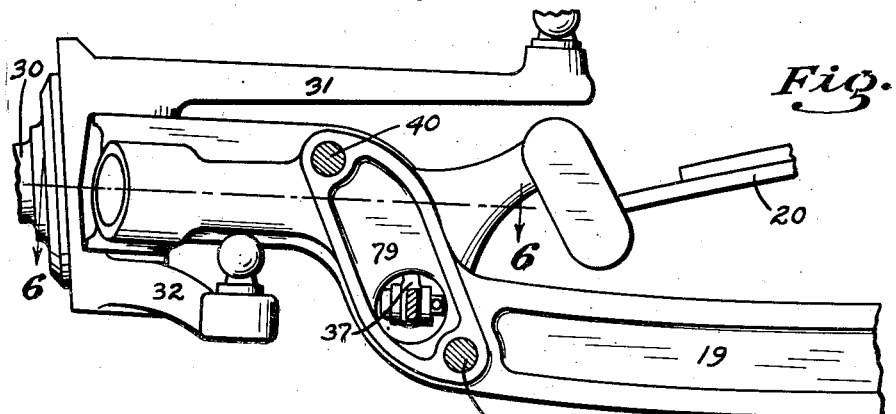
Figure 5 shows side elevation looking forwardly of one end of the front axle, the radius rods being removed to better illustrate the construction.

Referring to Figure 1 of the accompanying drawings, it will be seen that I have provided a chassis frame 10 composed of front and rear cross members 11 and 12, respectively, the intermediate portions of which are secured to conventional transverse type springs. A pair of auxiliary frame side members 13 are bowed inwardly intermediate of their ends and it will be noted that a relatively short center cross member 14 connects the intermediate portions of these auxiliary members.

The frame thus provided is what is known as an X type frame and, while it has no special function in connection with my improved brake, has been described to bring out the complete structure used herein.

A conventional rear driving axle 15 is provided with a torque tube 77 extending forwardly therefrom, the forward end of this torque tube having a universal joint 16 disposed thereon which is ordinarily secured to the rear end of the motor associated with such vehicle. It is customary to mount the rear end of such motor on the center cross member 14 and to secure the universal joint 16 directly to the adjacent end of the motor. Driving wheels 17 are provided on each outer end of the axle 15 and a suitable transverse spring 18 extends from each end of the axle to the center of the rear cross member 12 where it is secured to the chassis frame.

Referring now to the front portion of the vehicle, it will be noted that I have provided a front axle 19, this axle having a front spring 20 shackled thereon, the center portion of which spring is secured to the center portion of the front cross member 11 in the conventional manner. Front wheels 21 are rotatably and steerably secured to the outer ends of the front axle 19. Each of the wheels 17 and 21 is provided with a brake drum 22 and in alignment within are disposed a pair of brake shoes 23, mounted in the conventional manner. An operating wedge 24 is reciprocally mounted between the adjacent ends of each pair of shoes, whereby upon the outward radial movement of these wedges the brake shoes are applied to the brake drums to thereby stop the wheels. It should be kept in mind that this application is not directly concerned with the brake drum shoes or wedge, as almost any design of mechanical brake may be readily operated by my improved hook-up, the device shown being merely one of the many brakes particularly adapted for use with my hook-up.

From Figure 1 of the drawings it will be noted that a pair of front radius rods 25 are provided, the forward ends of which are secured to the outer ends of the front axle, while the rear ends of these radius rods are secured together and to the center cross member 14. Each of these radius rods 25 is of tubular section, with their rearmost ends welded to cup-shaped housings 26.

The two housings 26 are adapted to have their rim portions secured together to form a complete closure and to join the rearmost ends of these front radius rods. A bolt 27 extends axially through the center of the cup members and secures the members together. It will be noted that each of the cup members is formed integrally with one-half of a spherical ball 28, which ball is adapted to be universally secured in the frame cross member 14 to thereby allow both pivotal and oscillating movement of the radius rods around the frame cross member in the conventional manner.

Figure 6:
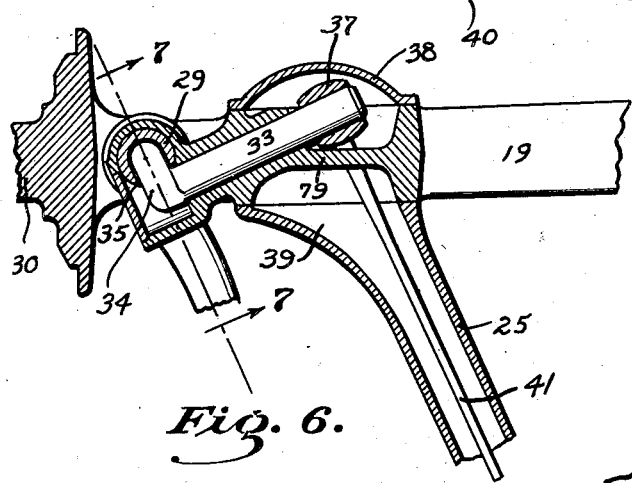
Figure 6 shows a sectional view, taken on the line 6—6 of Figure 5.
Figure 7:
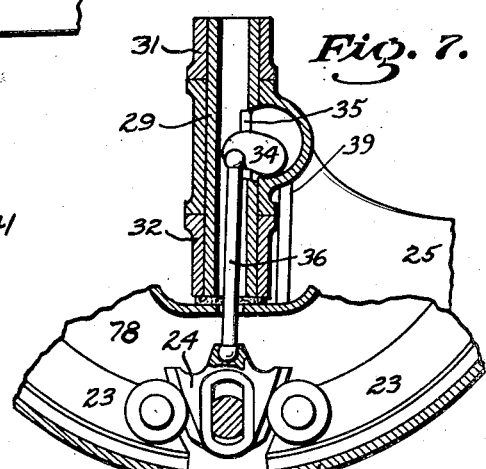
Figure 7 shows a sectional view, taken on the line 7—7 of Figure 6.

Referring now to Figures 5 through 7, it will be noted that a conventional vertically extending eye is formed in each end of the axle 19 in each of which eyes a hollow king-pin 29 is secured. A wheel spindle 30 is forged integrally with a steering arm 31 and drag link arm 32 and these forgings are pivotally secured to the protruding ends of the king-pins. Each front wheel 21 is rotatably mounted upon its spindle 30 and an anchor plate 78 is fixed to the spindle in alignment therewith. Upon this anchor plate the brake wedge 24 is reciprocally mounted in substantial alignment with the king-pin 29. A short brake operating shaft 33 is rotatably mounted in each outer end of the axle 19 and each shaft 33 is provided with a crank 34, which crank is housed in a relatively large bore in the outer end of the axle just rearwardly of the king-pin. It will be further noted that the center portion of each king-pin 29 is slotted at 35 whereby the crank 34 upon rotation may swing into the hollow bore in the king-pin. A ball ended push rod 36 extends between the free end of the crank 34 and the wedge 24 whereby upon rotation of the shaft 33 in one direction the wedge 24 will be pushed downwardly between the adjacent pair of brake shoes 23 to thereby apply the brakes to the adjacent drum.

It will be noted that the end portions of the axle in which the shafts 33 are rotatably mounted are offset vertically from the intermediate portion of the axle and that arms 37 are fixedly secured to the outer end of each shaft 33, these arms extending downwardly with their lower ends substantially aligned with the intermediate portion of the axle 19. The axle is, of course, forged with portions 79 connecting the ends with the intermediate portion. A cover 38 is fixed over each portion 79 to thereby completely enclose each arm 37.

The forward end of each radius rod 25 is flanged at 39, which flange is secured to the portion 79 by a pair of bolts 40. Due to the portions 79 extending vertically, the flanges 39 effectively prevent the axle from turning or twisting, due to the application of the brakes. A flat strip 41 extends through each of the radius rods 25, the forward ends of each of which are secured to the lower end of the respective arm 37. These strips comprise the brake operating rods.

Referring now to Figure 4, it will be noted that each of housings 26 is provided with a shaft bearing 42 in which a pair of shafts 43 are rotatably mounted. One of these shafts 43 is provided with a pin 44 which fits in a socket in the other shaft, whereby axial alignment of the two shafts when the two housings are assembled together is assured. It will be further noted that the adjacent ends of each of the shafts 43 are provided with arms 45 which extend downwardly in their respective housing, the lower end of each arm being secured to the rear end of the adjacent rod 41. The lower end of each of the arms 45 is clevised and the length of the clevis end of one of the arms is considerably longer than the clevis on the other arm. I have provided a pin 46 which extends through the short clevis and part way into the adjacent long clevis of the opposite arm, numbered 87, to thereby not only secure the adjacent brake rod 41 to the arm but also to secure the free ends of the two arms together. It would, of course, be possible to extend one long pin entirely through the clevised ends of both of the arms 45; however, such device would be extremely difficult to assemble. A short clevis pin 80 extends part way through the long clevised arm to secure the other rod 41 to its arm 45. The function of this arrangement is to permit the rods 41 to be connected to the arms 45 and then upon assembly of the two housings 26 together, the arms will be connected together and operate as a single arm.

An operating arm 47 is secured to the outer end of one of the shafts 43, whereby oscillation of the arm 47 will apply both of the front wheel brakes simultaneously.

Figure 8:
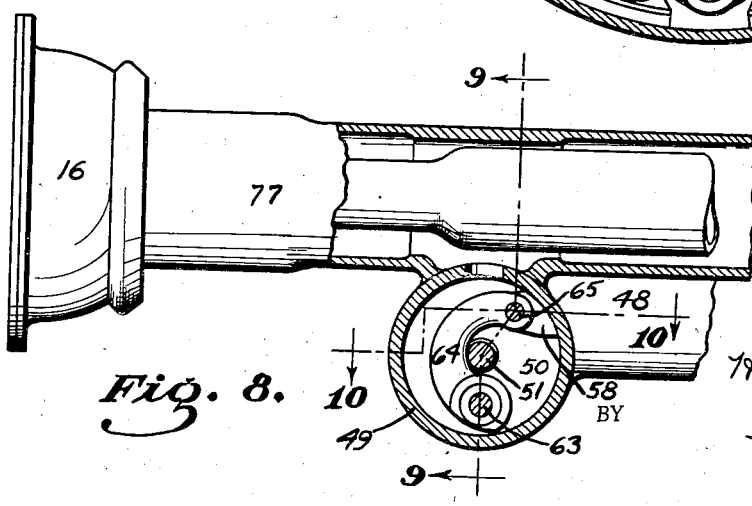
Figure 8 shows a sectional view, taken on the line 8—8 of Figure 1.

Referring now to the brake associated with the rear wheels, it will be seen that a pair of radius rods 48 extend from the outer ends of the axle 15 to position just beneath the forward end of the torque tube. It will be seen from Figure 8 that a transverse cylindrical housing 49 is welded to the under side of the torque tube in position just rearward of the universal joint 16. The forward end of each of the radius rods 48 are welded to cup-shaped housings 50, the edges of which housings are shouldered to fit into a correspondingly shaped end on the housing 49 whereby the axial movement of the housing members relative to each other is prevented. A single bolt 51 extends axially through the center of the housings 50 and 49 whereby the forward ends of the two rear radius rods are fixedly secured to the housing 49 and consequently to the torque tube 77. The rear end of each radius rod 48 is flanged, as shown at 81, and each of the flanges 81 is adapted to coact with a brake anchor plate 52 which is secured to the rear axle in position adjacent to the rear brakes. A flat strip 58 extends through each radius rod and serves as the brake operating rod for the adjacent wheel.

It will be noted from Figure 13 that a brake shaft bearing 53 is fixedly secured in the flanged portion 81 by means of a bolt 54 and that a cross shaft 55 is rotatably mounted in the bearings 53. A crank 56 is forged integrally with the outer end of each shaft 55, while a detachable arm 57 is secured to the inner end of each shaft 55 within the flanged portion 81. Thus the bearing 53, shaft 55, arm 57 and rod 58 may be assembled as a unit away from the car. It will be apparent that the flange 81 is adapted to be secured to the anchor plate 52 by means of a plurality of bolts 59. Now in order that the unit may be conveniently assembled, the anchor plate 52 is provided with an opening 60 therein in which the outer end of the bearing 53 is supported so that it is only required that the radius rod be secured in position to insure that the crank arm 56 is supported inside of the brake anchor plate 52 in position to operate the rear wheel brakes of the car. A suitable push rod and operating wedge is associated with each rear brake of the car which are operated by the cranks 56 in identically the same manner as the cranks 34 operate the front wheel push rods 36 and operating wedges 24. The anchor plates support the outer end of the bearings 53 when applying the brakes.

Referring to Figure 9, it will be noted that each of the housings 50 is provided with a bearing boss 61 in which a brake operating shaft 62 is rotatably mounted, these shafts being axially aligned when the housings are assembled. The inner end of one shaft 62 is provided with an axial opening therein in which a pin 63 formed on the other shaft extends to maintain the shafts in axial alignment independently of the housings 50. The inner ends of each of these shafts are forged integrally with arms 64, the free ends of which are clevised to the forward ends of the brake rods 58. One of the clevis pins 65 in these two arms is longer than the other so that it projects from the inner side of the arm into the clevis pin opening in the adjacent arm thereby fixedly securing the two arms 64 together. For this reason each shaft 62, arm 64 and brake rod 58 may be assembled outside of the car and a pair of these members readily clamped over the cylindrical housing 49 and secured therein by means of the bolt 51.

Each of the shafts 62 projects outwardly somewhat beyond the ends of their bearing bosses 61 and a service brake operating arm 66 is secured to one of these shafts while a parking brake operating arm 67 is secured to the other of these shafts. However, it is immaterial which one of the arms 66 or 67 is oscillated as the application of either applies both rear wheel brakes.

Referring now to the linkage shown in Figure 11, it will be noted that I have provided a service brake operating pedal 68 which is rotatably mounted upon a suitable shaft 69, this shaft being secured to the frame of the vehicle. The pedal 68 is provided with an upwardly extending arm 70 and also a downwardly extending arm 71. A suitable tension rod 72 connects the arms 70 and 66, the rearmost end of which rod is slotted as at 73 whereby upon actuation of the pedal 68 the arm 66 will be drawn forwardly to apply the rear brakes of the vehicle but the arm 66 may be oscillated forwardly without moving the pedal. It will be noted that the rod 72 intersects a transverse horizontal line passing substantially through the axial center of the universal joint so that vertical movement of the rear axle and torque tube around the universal joint will have practically no effect in lengthening or shortening the effective length of the rod 72.

A parking brake lever 74 is pivotally mounted upon the frame 10, the lower end of this lever being secured to a rod 75 which extends rearwardly where it is secured to the arm 67. The rear end of the rod 75 is likewise slotted whereby the pedal and lever may be operated independently of each other and either will actuate both the rear wheel brakes of the car. A short link 76 connects the lower end of the arm 71 with the arm 47 so that upon actuation of the pedal 68 not only will the rear brakes be applied but also the front brakes will simultaneously be applied.

It will be further noted that the path described by the free end of the arm 71 passes through a transverse horizontal line through the center of the radius rod ball 28 whereby normal oscillation of the front radius rod will not effect the application of the front brakes.

Referring now to the alternate construction shown in Figure 14, it will be seen that I have provided a single shaft 82 which extends through both bearings 61 and to the respective ends of which the arms 66 and 67 are secured. A single arm 83 is forged integrally with the intermediate portion of this shaft, the upper end of which arm is also forged integrally with a relatively long sleeve 84. Each brake rod 58 is secured to this sleeve by means of a pair of pins 85 which are inserted into the sleeves. The housings 50 in this case are provided with arcuate guide surfaces 86 so that the pins 85 cannot pull out from the sleeve 84 as long as the device is assembled to the housing 49.

When assembling this construction together one rod 58 must be loose within the radius rod, as the housing 50 is fitted to the housing 49. The pin 85 being held in the end of the rod 58, however, is readily inserted into the sleeve 84. No cotter keys are required to hold this pin in position so that its assembly, while not as convenient as in the preferred structure, may still be preferable in some instances due to its reduced cost.

Among the many advantages arising from the use of my improved device it may be well to mention that exceptional safety is provided with this brake hook-up which results from the arrangement of parts whereby upon the breakage of any one part of the system, still at least the brakes on two wheels of the vehicle will remain operative and effective.

Still a further advantage resulting from this construction arises because all brake operating mechanisms associated with the wheel brakes are fully enclosed to be thereby protected against ice, dirt and the like and thus provide unfailing operation at all times.

Still a further advantage results from the fact that the brake rods and operating mechanism may be assembled in their respective radius rods away from the car and then by simply bolting the radius rods in position the connections are automatically made whereby the brake is rendered operative. This feature does not apply to the forward end of the front radius rod which must be connected to the operating arm 37 after the radius rod is assembled in position, however, this arm is readily accessible by removal of the cover 38.

Some changes may be made in the arrangement, construction and combination of the various parts of my improved device without departing from the spirit of my invention and it is my intention to cover by my claims such changes as may reasonably be included within the scope thereof.

I claim as my invention:

1. A vehicle brake hook-up for connecting a brake operating member associated with the vehicle frame with the brake associated with one wheel of the vehicle comprising, a detachable rigid member extending from a position adjacent to said wheel to a position adjacent to said operating member, a brake rod supporting lever pivotally mounted upon and supported wholly by said rigid member, and a brake rod having one end secured to said support with the other end operatively connected to said wheel brake, said brake rod extending parallel to said rigid member and in position to be protected thereby.

2. A hook-up, as claimed in claim 1, wherein said rigid member is adapted to support the axle associated with said wheel brake against longitudinal movement.

3. A hook-up, as claimed in claim 1, wherein said rigid member is of tubular construction and wherein said brake rod extends longitudinally through said tube.

4. In a motor vehicle brake hook-up, the combination of a vehicle frame, a rear axle, radius rods extending from the ends of said axle to said frame, braking wheels rotatably mounted on the ends of said axle, and operating rods for said brakes extending through said radius rods, said operating rods being supported wholly by said radius rods so that said radius rods and enclosed operating rods may be assembled as a unit.

5. In a motor vehicle, a rear axle having a torque tube extending forwardly therefrom, radius rods extending from the outer ends of said axle to the forward end of said torque tube, an open-ended housing fixedly secured to said torque tube, said housing enclosing brake operating mechanism, and enclosures for the ends of said housing fixedly secured to the forward end of each radius rod, whereby upon securing said radius rod closures to said housing, said radius rods may be anchored to the torque tube.

6. A vehicle wheel brake operating device comprising, an axle having its end portions offset vertically from its intermediate portion with vertical connecting portions, a brake operating shaft rotatably mounted in each offset end of said axle, and an operating arm on each shaft horizontally aligned with the adjacent vertical portion of the axle, whereby said arms will be protected over their full length by said axle.

7. A device, as claimed in claim 6, wherein said arms are housed within chambers formed in said axle.

8. A device, as claimed in claim 6, wherein a radius rod coacts with each vertical portion of the axle to thereby prevent twisting thereof due to the actuation of said brake.

9. A motor vehicle brake hook-up comprising, a front axle, a pair of radius rods extending between the outer ends of said axle and the center portion of the vehicle frame, wheels rotatably mounted on the respective ends of said axle, a brake associated with each of said wheels, the rearmost ends of said radius rods being of cup shape and coacting with each other to form a two part closure, a pair of brake rod operating arms pivotally mounted within said closure, one in each half thereof, and a pair of brake operating rods having their rearmost ends secured to said arms, respectively, and having their forward ends operatively connected to said brakes, said rods being disposed within said radius rods.

10. A brake hook-up, as claimed in claim 9, wherein the respective halves of the two part housing associated with the rearmost ends of said radius rods are complementary to each other, and wherein a single bolt extends transversely through said half for the purpose described.

11. A vehicle brake hookup comprising, a pair of axially aligned brake operating shafts rotatably mounted upon a transverse axis at the center of the vehicle frame, a pair of arms each of which extend radially from said respective shafts, said arms both having their outer ends clevised, brake operating rods extending between the brakes associated with wheels of said vehicle and the respective clevises of said arms, and a pair of clevis pins each extending through one of said clevises with one of said clevis pins projecting into the clevis opening in the other of said arms, so that said brake operating rods are secured to their respective operating arms and said arms are secured to each other.

HENRY FORD.